(No Model.)
T. L. KAUFFER & J. SERSON.
GALVANIC BATTERY.
No. 272,058. Patented Feb. 13, 1883.
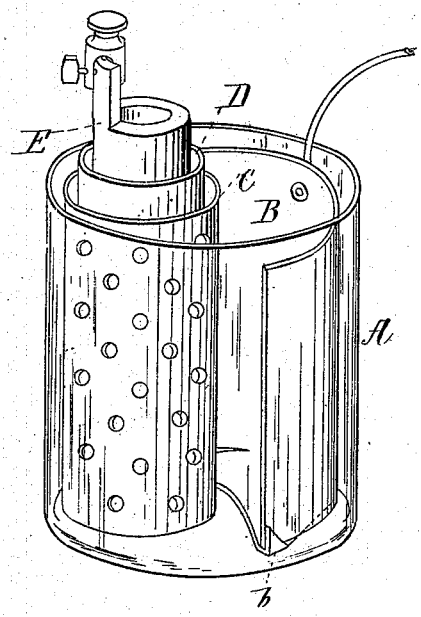
Fig. 1.
  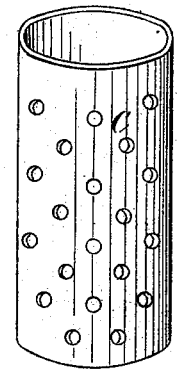 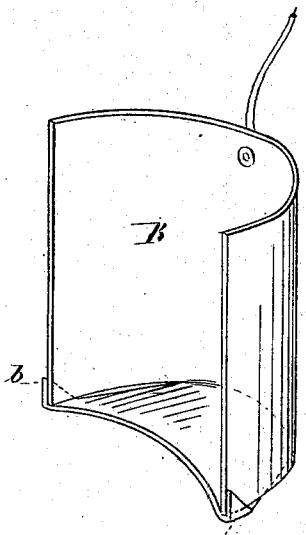
Fig. 2.  Fig. 3.  Fig. 4.  Fig. 5.

UNITED STATES PATENT OFFICE.

THEODORE L. KAUFFER AND JAMES SERSON, OF BOSTON, MASSACHUSETTS, ASSIGNORS OF ONE-THIRD TO CHARLES H. DENNIE, OF SAME PLACE.

GALVANIC BATTERY.

SPECIFICATION forming part of Letters Patent No. 272,058, dated February 13, 1883.

Application filed July 26, 1882. (No model.)

*To all whom it may concern:*

Be it known that we, THEODORE L. KAUFFER and JAMES SERSON, residing at Boston, in the county of Suffolk and State of Massachusetts, have invented certain new and useful Improvements in Galvanic Batteries; and we do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

Our invention relates to improvements in galvanic batteries of the class commonly known as "double-fluid" batteries.

The object of our invention is to produce a battery which shall give an even and strong current of electricity for a great length of time without the necessity of frequently cleaning and replacing the material of which it is composed.

The common double-fluid batteries now in use are expensive, by reason of the large amount of material required to make them continuously effective and the labor necessary to keep them clean and free from the impurities produced by the decomposition of these materials. Our construction reduces the expense in a great degree. When large numbers of batteries are used the destruction of property is often great by the overflow of the decomposed metals and their impurities from the cells of the batteries, while in withdrawing the battery from the circuit for cleaning and replacement the loss in the strength of the current produced causes great inconvenience. The use in galvanic batteries of amalgamated zinc plates and the benefits derived therefrom are well-known chemical facts. With an open circuit, however, conditions are soon developed which greatly impair and at last wholly destroy the efficiency of the amalgamation. These conditions are so much more rapidly developed with a closed circuit that amalgamation may be said to have no effect under the last-named condition, and the zinc soon loses its amalgam.

Our invention consists in the galvanic battery, as will be hereinafter more fully set forth, whereby the zinc plate is kept constantly amalgamated, whether the circuit is closed or open, and constantly exposes a clear surface of pure zinc to the action of the fluid about it.

In the accompanying drawings, Figure 1 represents a perspective view of our battery set up; Fig. 2, a perspective view of the zinc cylinder; Fig. 3, a perspective view of the porous cup; Fig. 4, a perspective view of the perforated porous cylinder; Fig. 5, a perspective view of the copper plate.

The cell A, of glass or earthenware, the copper plate B, the perforated porous cylinder C, the porous cell D, and hollow cylinder of zinc E, with the fluids used as described below, constitute our battery.

The copper plate B we make in a semi-cylindrical form, with a bottom bent, as shown in the drawings, Fig. 5, to hold the semi-cylinder in place in the outer cell by the weight upon it of the crystallized sulphate of copper, and also to keep it in shape by the points turned up, $b\ b$. The advantage of this shape is apparent. When it is necessary to clean the copper plate B the ends thereof are bent back, so as to form a flat plate, whereby all the impurities can be easily removed.

The porous perforated cylinder is used to allow the inner cell, D, to be easily removed and replaced without having to disturb the crystallized sulphate of copper.

We set up our battery in the following manner: On one side of the outer cell, A, is fitted the copper plate B, of about four or five ounces in weight. On the other side, free from contact with the copper plate B, is the porous cylinder C, within which is the inner cell, D, into which is placed about four ounces of free metallic mercury and the zinc plate E thoroughly amalgamated, and weighing about four pounds. In the outer cell, between the porous cylinder and the copper plate, is placed about three and one-half pounds of sulphate of copper in crystals. Pure water is then added to the outer and inner cells, and the battery is ready for use.

We do not intend to confine ourselves to the particular weight of materials above named; but those named are the weights we use by preference when the outer cell is about seven inches high and about seven inches in diameter.

We have found that the action of the voltaic current by its electrolytic decomposition on the liquids in the inner cell keeps the zinc plate thoroughly amalgamated, and consequently clean, whether the circuit is closed or open for a great length of time. When the circuit is open the amalgamation of the zinc plate from the free mercury does not go on; but as soon as the circuit is closed the action of the current causes the free mercury to be deposited on the zinc plate and renews the amalgamation, so the renewal of the amalgamation is constant while the circuit is closed and is affected when the circuit is open. When the zinc is exposed to the deposit of the sulphate of copper the amalgamation is likely to be somewhat affected by deposits of cupric sulphate; but as the perforated porous cup in our battery resists all or nearly all of the cupric sulphate deposited, there is no direct action on the zinc plate by the sulphate of copper when the circuit is open. Of course it is well known that when the circuit is closed and the zinc plate is amalgamated there is no action on the zinc by the acidulated water surrounding it. It is also well known that when almost any metal is interposed between the poles and the circuit is closed the decomposition by the electric current is affected, and in our battery, under these conditions, the mercury is transferred by the use of a proper solvent and the electric current and deposited on the zinc plate. The mercury on the surface of the zinc plate acts as a solvent and gives freedom of motion to the zinc particles. These, by the action of the electric current, are brought to the surface of the plate, and impurities are forced back into the interior, so that the zinc plate constantly exposes a surface of pure zinc to the action of the acidulated water.

In a battery of this kind the two points of importance are to keep the zinc and copper plates as clean as possible and prevent the zinc sulphate from being deposited on the copper or positive pole and prevent the copper or cupric sulphate from being deposited on the zinc or negative pole. The electric current will cease as soon as the copper plate is covered by deposits of zinc or the zinc with deposits of copper, as then you have two zinc or two copper sets of poles. We keep the zinc plate clean by continuous amalgamation when the circuit is closed, and we prevent the deposits of the zinc sulphate on the other opposite poles by the perforated porous cup and porous cell, and also greatly aid the porous cup and porous cell by the solutions used, we using little or no acid, but crystallized sulphate of copper.

A battery constructed as above can be kept in use continuously for months without adding any materials to it, and without any cleaning, and avoids all the objections named above.

Having thus described our invention, what we claim as new, and desire to secure by Letters Patent, is—

1. A galvanic battery consisting of the cell A, the semi-cylindrical copper plate B, formed with the bent bottom, the perforated porous cylinder C, the porous cell D, and cylinder of zinc E, with the metallic mercury and other fluids, as above set forth, all arranged and used for the purposes herein specified, substantially as described.

2. As a negative element for a galvanic battery, the semi-cylindrical copper plate B, formed with the bent bottom, substantially as and for the purpose set forth.

In testimony whereof we affix our signatures in presence of two witnesses.

THEODORE L. KAUFFER.
JAMES SERSON.

Witnesses:
WM. B. H. DOWSE,
WM. E. ROBINSON.